United States Patent
Schwark et al.

(10) Patent No.: US 6,854,759 B2
(45) Date of Patent: Feb. 15, 2005

(54) APPARATUS INCLUDING AN INFLATABLE KNEE BAG

(75) Inventors: Diane M. Schwark, Lenox, MI (US); Hector Javier Zarazua Mauleon, Rochester Hills, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 10/409,971

(22) Filed: Apr. 9, 2003

(65) Prior Publication Data

US 2004/0201209 A1 Oct. 14, 2004

(51) Int. Cl.$^7$ .............................................. B60R 21/22
(52) U.S. Cl. ................................................. 280/730.1
(58) Field of Search ....................... 280/743.1, 730.1, 280/732, 751, 752

(56) References Cited

U.S. PATENT DOCUMENTS

| | | |
|---|---|---|
| 2,834,606 A | 5/1958 | Bertrand |
| 3,642,303 A | 2/1972 | Irish et al. |
| 3,702,706 A | 11/1972 | Sobkow |
| 4,948,168 A | 8/1990 | Adomeit et al. |
| 5,324,070 A | 6/1994 | Kitagawa et al. |
| 5,336,652 A | 8/1994 | Mink et al. |
| 5,342,083 A | 8/1994 | Gentile et al. |
| 5,398,958 A | 3/1995 | Taggart |
| 5,398,968 A | 3/1995 | Emambakhsh et al. |
| 5,513,877 A | 5/1996 | MacBrien et al. |
| 5,533,745 A | 7/1996 | Jenkins et al. |
| 5,588,668 A | 12/1996 | Emambakhsh et al. |
| 5,636,861 A | 6/1997 | Orsulak et al. |
| 5,651,562 A | 7/1997 | Hagen et al. |
| 5,730,463 A * | 3/1998 | Fisher et al. .............. 280/743.1 |
| 5,738,366 A | 4/1998 | Phillion |
| 5,755,459 A | 5/1998 | LaLonde |
| 5,813,693 A | 9/1998 | Gordon et al. |
| 5,873,598 A * | 2/1999 | Yoshioka et al. ............ 280/740 |
| 5,884,939 A * | 3/1999 | Yamaji et al. ............ 280/743.1 |
| 6,073,959 A | 6/2000 | Heinz et al. |
| 6,170,871 B1 | 1/2001 | Goestenkors et al. |
| 6,186,542 B1 | 2/2001 | Enders et al. |
| 6,299,202 B1 * | 10/2001 | Okada et al. ................ 280/732 |
| 6,382,664 B1 * | 5/2002 | Hirano et al. ............. 280/730.2 |
| 6,619,691 B1 * | 9/2003 | Igawa ......................... 280/732 |
| 6,692,024 B2 * | 2/2004 | Fischer et al. ............ 280/743.1 |
| 2003/0006597 A1 * | 1/2003 | Fischer et al. ............ 280/743.1 |
| 2003/0094795 A1 * | 5/2003 | Takimoto et al. ......... 280/730.1 |
| 2003/0120409 A1 * | 6/2003 | Takimoto et al. .............. 701/45 |
| 2003/0132617 A1 * | 7/2003 | Takimoto et al. ......... 280/730.1 |

FOREIGN PATENT DOCUMENTS

JP      06227353 A  *  8/1994  ........... B60R/21/20

OTHER PUBLICATIONS

Research Disclosure Sep. 2002 No. 461 "Inflatable Knee Bag".

* cited by examiner

*Primary Examiner*—Faye M. Fleming
(74) *Attorney, Agent, or Firm*—Tarolli, Sundheim, Covell, & Tummino L.L.P.

(57) ABSTRACT

An apparatus (10) helps to protect an occupant (12) of a vehicle (14) having an instrument panel (34) by preventing a forceful impact between lower portions (48) of legs (50) of the occupant (12) and the instrument panel (34) during a vehicle collision. The apparatus (10) comprises an inflator (18) that is actuatable for providing inflation fluid and an inflatable vehicle occupant protection device (20) for receiving inflation fluid from the inflator (18). The protection device (20) inflates from a stored condition to an inflated condition (46) engaging the lower portions (48) of legs (50) of the occupant (12). The protection device (20), when in the stored condition, includes a rolled lower portion (176) and an upper portion (178) that is folded into a stack (180) of pleated sections.

32 Claims, 4 Drawing Sheets

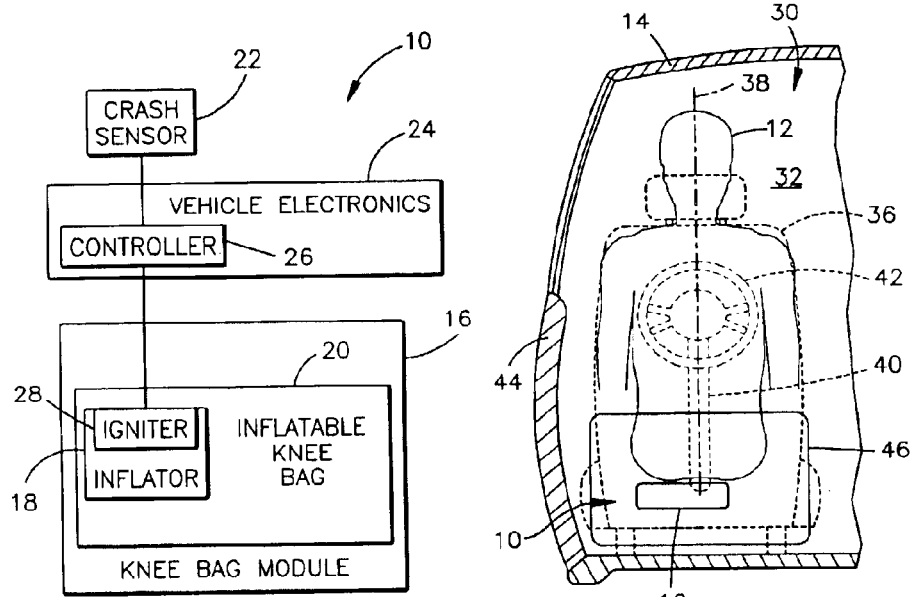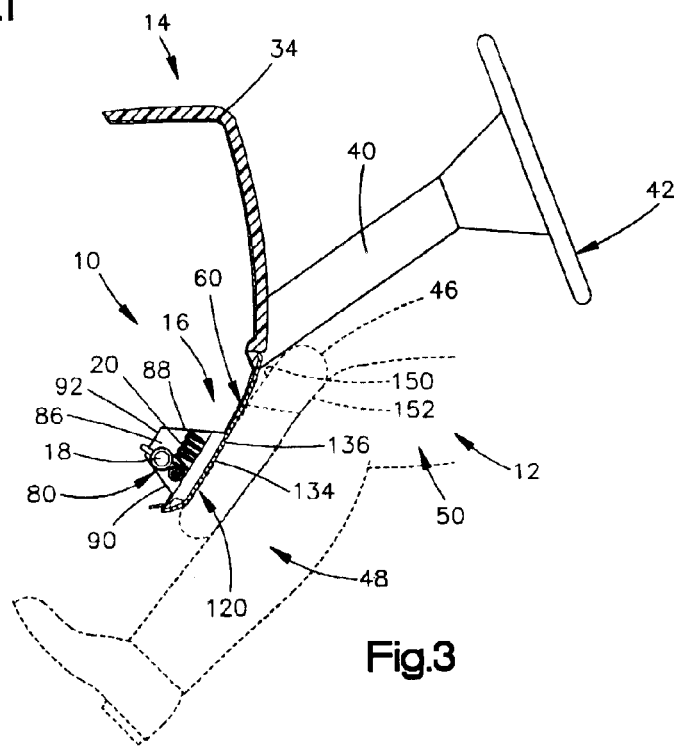

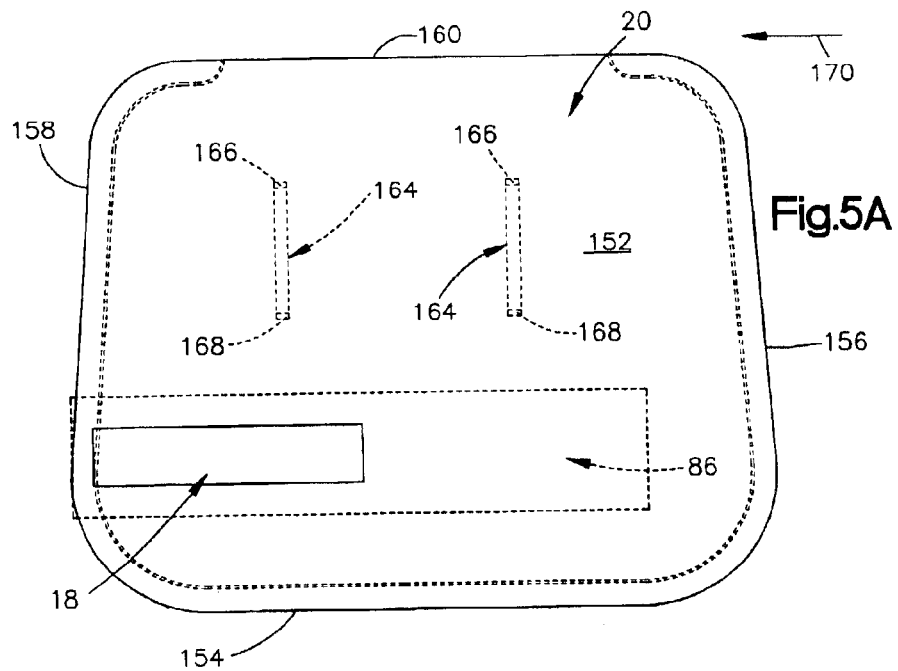
Fig.5A
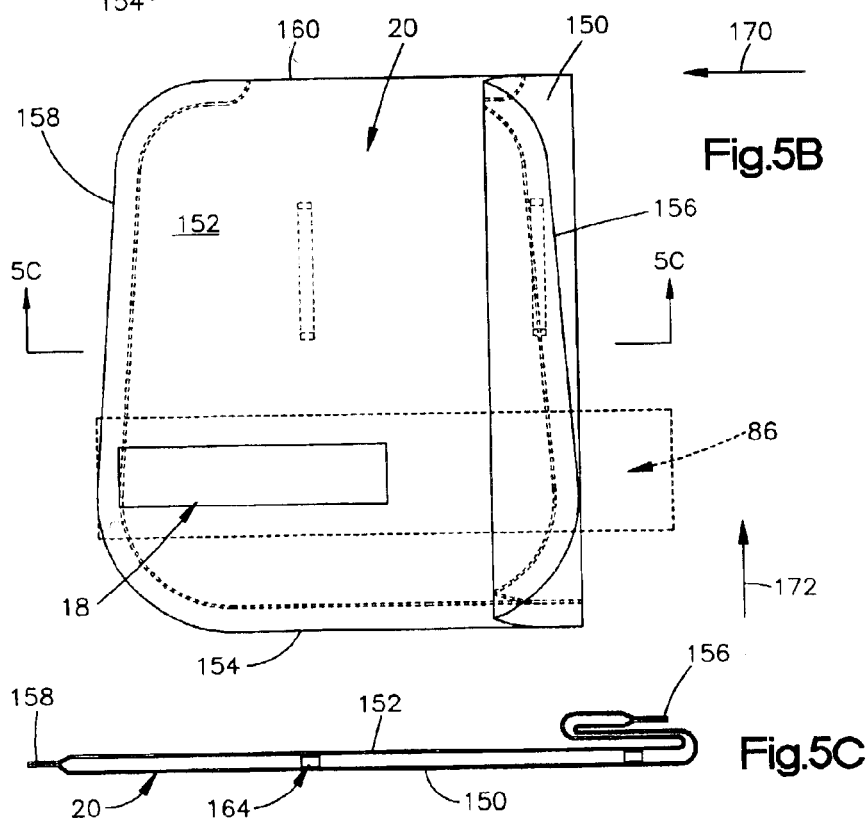
Fig.5B
Fig.5C

US 6,854,759 B2

APPARATUS INCLUDING AN INFLATABLE KNEE BAG

TECHNICAL FIELD

The present invention relates to an apparatus including an inflatable vehicle occupant protection device and, more particularly, to an apparatus including an inflatable knee bag.

BACKGROUND OF THE INVENTION

It is known to inflate an inflatable knee bag between an instrument panel of a vehicle and lower portions of an occupant's legs for helping to protect the occupant during a crash condition. A conventional inflatable knee bag forms a portion of an inflatable knee bag module that is attached to the instrument panel of the vehicle.

Positioning of an inflatable knee bag module on the driver's side of the vehicle requires consideration of the steering column of the vehicle. Since the steering column extends outwardly of the instrument panel of the vehicle, the space available on the instrument panel for attaching the inflatable knee bag module is limited. As a result, the inflatable knee bag module may be attached to the instrument panel in a position that is offset to one side of the steering column. When actuated, it is desirable for the inflatable knee bag of an offset inflatable knee bag module to inflate laterally past the steering column so that the inflated knee bag is located between the instrument panel and the lower portions of both legs of the occupant. It is also desirable for the inflatable knee bag to inflate into a location between the instrument panel and knees of the occupant.

SUMMARY OF THE INVENTION

The present invention relates to an apparatus for helping to protect an occupant of a vehicle having an instrument panel by preventing a forceful impact between lower portions of legs of the occupant and the instrument panel during a vehicle collision. The apparatus comprises an inflator that is actuatable for providing inflation fluid and an inflatable vehicle occupant protection device for receiving inflation fluid from the inflator and inflating from a stored condition to an inflated condition engaging the lower portions of legs of the occupant. The inflatable vehicle occupant protection device includes upper and lower portions. The lower portion is rolled and the upper portion is folded into a stack of pleated sections when the vehicle occupant protection device is in the stored condition.

According to another aspect, the present invention relates to an apparatus for helping to protect an occupant of a vehicle having an instrument panel by preventing a forceful impact between lower portions of legs of the occupant and the instrument panel during a vehicle collision. The apparatus comprises a reaction plate that is attached to the instrument panel of the vehicle and that includes structure defining a cavity having an opening. The apparatus also comprises an inflator and an inflatable vehicle occupant protection device. The inflator is located in the cavity and is secured to the structure of the reaction plate. The inflator is actuatable for providing inflation fluid. The inflatable vehicle occupant protection device, in response to receiving inflation fluid, inflates from a stored condition within the cavity to an inflated condition engaging the lower portions of legs of the occupant. The inflatable vehicle occupant protection device, when in the stored condition, includes a stack of pleated sections that extends upwardly from a rolled portion. The apparatus further comprises a cover for covering the opening of the cavity for protecting the inflatable vehicle occupant protection device when the inflatable vehicle occupant protection device is in the stored condition. The cover includes a portion that is rupturable by the inflatable vehicle occupant protection device to enable expansion of the inflatable vehicle occupant protection device from the stored condition to the inflated condition.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a schematic illustration of an apparatus constructed in accordance with the present invention;

FIG. 2 is a schematic sectional view of a driver's side of a vehicle including an apparatus constructed in accordance with the present invention;

FIG. 3 is a schematic sectional view of an apparatus constructed in accordance with the present invention mounted in an instrument panel of the vehicle;

FIGS. 5A–5F illustrate a method of compacting an inflatable knee bag of the apparatus into a stored condition.

DETAILED DESCRIPTION OF THE INVENTION

Figure 4:
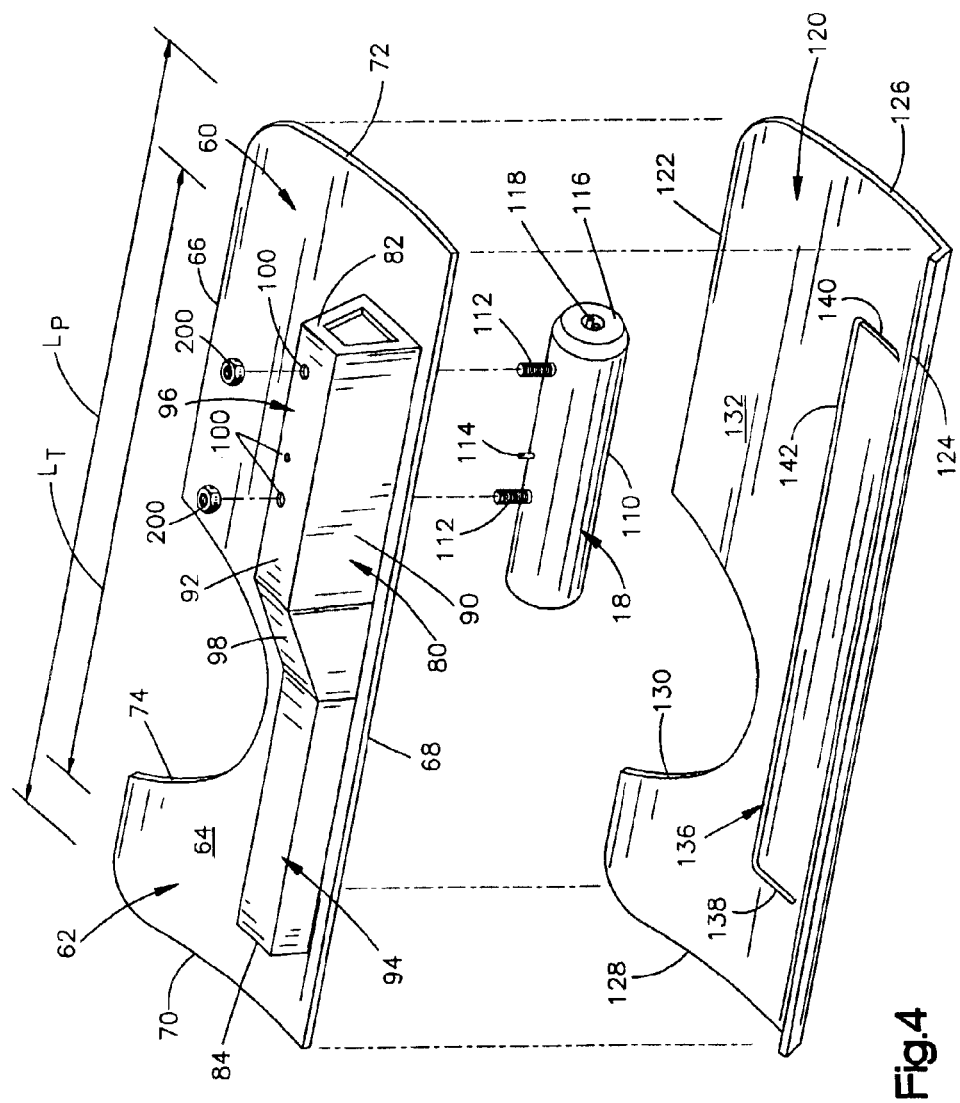
FIG. 4 is an exploded perspective view of a reaction plate, an inflator, and a cover of the apparatus of FIG. 2.

The present invention relates to an apparatus 10 for helping to protect an occupant 12 (FIG. 2) of a vehicle 14 (FIG. 2). As shown in FIG. 1, the apparatus 10 includes a knee bag module 16. The knee bag module 16 includes an inflator 18 and an inflatable knee bag 20. The inflator 18 is actuatable to provide inflation fluid for inflating the inflatable knee bag 20 from a stored condition within the knee bag module 16 to an inflated condition for helping to protect the occupant 12 of the vehicle 14.

The apparatus 10 of FIG. 1 also includes a crash sensor 22 for sensing a vehicle crash condition and for providing a signal indicative of the vehicle crash condition to vehicle electronics 24. The vehicle electronics 24 include a controller 26 that receives the signal from the crash sensor 22. The controller 26 runs an algorithm for determining whether the inflatable knee bag 20 should be actuated in response to the signal from the crash sensor 22. When the controller 26 determines that inflation of the inflatable knee bag 20 is desirable, the controller 26 outputs an actuation signal to the inflator 18 of the knee bag module 16. The inflator 18 includes an igniter 28 that, in response to the actuation signal, actuates the inflator 18 to provide inflation fluid.

The inflator 18 is in fluid communication with the inflatable knee bag 20. Inflation fluid provided by the inflator 18 flows into the inflatable knee bag 20 and inflates the inflatable knee bag from the stored condition, shown by solid lines in FIG. 3, to the inflated condition, shown by dashed lines in FIG. 3.

FIG. 2 illustrates, in cross-section, a driver's side 30 of the vehicle 14 that includes an apparatus 10 constructed in accordance with the present invention. The vehicle 14 includes a passenger compartment 32. An instrument panel 34 (FIG. 3) is located on a front side of the passenger compartment 32. The front side of the vehicle 14 is illustrated as being into the plane of FIG. 2 and to the left in FIG. 3.

The driver's side 30 of the passenger compartment 32 includes a driver's seat 36, shown by dashed lines, which faces the instrument panel 34 of the vehicle 14. FIG. 2 illustrates an imaginary plane 38, which extends longitudinally through the vehicle 14, i.e., into and out of the plane of FIG. 2, and defines a centerline of the driver's seat 36.

Throughout this description, the term "outboard side" refers to a location to the left of plane 38, as viewed in FIG. 2, and the term "inboard side" refers to a location to the right of plane 38, as viewed in FIG. 2. As illustrated in FIG. 2, the plane 38 also passes through the steering column 40 and a center of the steering wheel 42 of the vehicle 14.

FIG. 2 illustrates schematically the apparatus 10 associated with the driver's seat 36 of the vehicle. The knee bag module 16, shown schematically in FIG. 2, of the apparatus 10 is located within the instrument panel 34 of the vehicle 14. The center of the knee bag module 16 is offset to the outboard side of plane 38. FIG. 2 also illustrates the inflatable knee bag 20 in an inflated condition, indicated at 46. When in the inflated condition 46, the inflatable knee bag 20 is centered relative to plane 38.

FIG. 3 illustrates, in section, the knee bag module 16 mounted in the instrument panel 34 of the vehicle 14. When in the inflated condition 46, the inflatable knee bag 20 is located between the instrument panel 34 and the lower portions 48 of the occupant's legs 50. Only one leg is shown in FIG. 3. The inflatable knee bag 20, when in the inflated condition 46, helps to protect the occupant 12 by preventing a forceful impact between the lower portions 48 of the legs 50 of the occupant 12 and the instrument panel 34 during a vehicle collision.

During inflation of the inflatable knee bag 20 from the stored condition to the inflated condition 46, the inflatable knee bag 20 expands laterally (to the right as viewed in FIG. 2) across plane 38 so that in the inflated condition 46 the inflatable knee bag is located between the instrument panel 34 and the lower portions 48 of both legs 50 of the occupant 12 of the driver's seat 36. During the lateral expansion of the inflatable knee bag 20, interference with the steering column 40 is avoided.

FIG. 3 illustrates the steering column 40 and steering wheel 42 of the vehicle 14. The steering column 40 extends outwardly of the instrument panel 34 along plane 38, as shown in FIG. 2. The knee bag module 16 illustrated in FIGS. 2 and 3 is offset to the outboard side of the steering column 40 and below the steering column. As shown in FIG. 2, a portion of the knee bag module 16 extends to the inboard side of plane 38.

The knee bag module 16 includes a reaction plate 60 for securing the knee bag module to structure of the vehicle 14 within the instrument panel 34. The reaction plate 60 illustrated in FIGS. 3 and 4 is formed from metal. As shown in FIG. 4, the reaction plate 60 includes a generally rectangular plate portion 62 having a front surface 64 and an opposite rear surface (not shown). The rear surface of the plate portion 62 is presented toward the passenger compartment 32 of the vehicle 14. The plate portion 62 of the reaction plate 60 includes an upper edge 66, a lower edge 68, an inboard edge 70, and an outboard edge 72. As shown in FIG. 4, the upper edge 66 of the plate portion 62 includes a semi-circular cutout 74 for receiving a portion of the steering column 40 of the vehicle 14.

A trough 80 is located adjacent the lower edge 68 of the plate portion 62 of the reaction plate 60. The trough 80 extends outwardly of the front surface 64 of the plate portion 62. The trough 80 has a length, indicated at $L_T$, that is defined between first and second side surfaces 82 and 84, respectively. The length $L_T$ of the trough 80 is approximately eighty percent of a length $L_P$ of the plate portion 62 of the reaction plate 60. The length $L_P$ of the plate portion 62 is defined as the distance between the inboard and outboard edges 70 and 72. The trough illustrated in FIG. 3 is centered on the reaction plate between the inboard and outboard edges 70 and 72 of the reaction plate 60.

The trough 80 defines a trapezoidal shaped cavity 86 (FIG. 3). The cavity 86 of the trough 80 may have a shape other than trapezoidal, such as cylindrical. An upper wall 88, a lower wall 90, and an end wall 92 of the trough 80 define the trapezoidal shape of the cavity 86. As shown in FIG. 3, the upper wall 88 of the trough 80 extends outward of the front surface 64 of the plate portion 62 of the reaction plate 60. The lower wall 90 of the trough 80 extends outward of the front surface 64 of the plate portion 62. The end wall 92 of the trough 80 connects the upper and lower walls 88 and 90 and defines a closed narrow end of the cavity 86. An opening is defined between the upper and lower walls 88 and 90 opposite the end wall 92. The opening forms the widest portion of the cavity 86.

As shown in FIG. 4, the trough 80 includes a shallow portion 94 and a deep portion 96. The deep portion 96 of the trough 80 extends outward of the front surface 64 of the plate portion 62 of the reaction plate 60 farther than the shallow portion 94. An angled portion 98 of the end wall 92 connects the shallow portion 94 and the deep portion 96 of the trough 80.

Three through-holes 100 extend through the end wall 92 of the trough 80 and open into the cavity 86 within the deep portion 96 of the trough. The three through-holes 100 are spaced from one another along the end wall 92.

The inflator 18 illustrated in FIG. 3 is a hybrid inflator and includes a cylindrical housing 110. Although a hybrid inflator is preferred, other types of inflators may be used for providing inflation fluid. Two mounting studs 112 extend outwardly of the cylindrical housing 110 of the inflator 18. A fill valve 114 extends outwardly of the housing 110 between the two mounting studs 112. The hybrid inflator 18 is filled with compressed gas through the fill valve 114. The fill valve 114 is sealed after the inflator 18 is filled to prevent leakage of the gas out of the inflator housing 110 through the fill valve 114.

The cylindrical housing 110 of the inflator 18 has first and second circular end walls, only the first end wall being shown at 116 in FIG. 4. A receptacle 118 is formed in the first end wall 116 of the inflator 18. The receptacle 118 is adapted to receive an electrical connector for connecting the inflator 18 to the vehicle electronics 24.

The knee bag module 16 also includes a cover 120. The cover 120 illustrated in FIGS. 3 and 4 is molded from plastic. The cover 120 is adapted to overlie the plate portion 62 of the reaction plate 60 of the knee bag module 16 and to cover the opening into the cavity 86, as is shown in FIG. 3. The cover 120 is generally rectangular and has a configuration and dimensions similar to the configuration and dimensions of the plate portion 62 of the reaction plate 60. As shown in FIG. 4, the cover 120 includes an upper edge 122, a lower edge 124, an outboard edge 126, and an inboard edge 128. A semicircular cutout 130 is removed from the upper edge 122 of the cover 120 near the inboard edge 128 of the cover 120 and is positioned to correspond to the position of the cutout 74 in the plate portion 62 of the reaction plate 60.

The cover 120 also includes a front surface 132 and rear surface 134 (FIG. 3). The front surface 132 of the cover 120 is adapted to be attached to the rear surface of the plate portion 62 of the reaction plate 60. The rear surface 134 of the cover 120 is visible to the occupant 12 of the vehicle 14 and may be designed to blend aesthetically with the instrument panel 34.

The cover 120 includes a tear seam 136. The tear seam 136 has an inverted U-shape that includes two leg portions 138 and 140, respectively, and an interconnecting portion 142 that extends between the two leg portions 138 and 140 of the tear seam. The two leg portions 138 and 140 of the tear seam 136 are positioned on the cover 120 in locations corresponding to the locations of the first and second side walls 82 and 84 of the trough 80 of the reaction plate 60. The interconnecting portion 142 of the tear seam 136 is positioned on the cover 120 in a location corresponding to the location of the upper wall 88 of the trough 80, adjacent the opening to the cavity 86. When subjected to a predetermined force, the tear seam 136 is adapted to open to form a flap that may be bent downwardly toward the lower edge 124 of the cover 120. Bending the flap downwardly provides an opening in the cover that is approximately the same size as the opening to the trough 80 of the reaction plate 60.

The inflatable knee bag 20 is illustrated in FIGS. 5A–5F. The inflatable knee bag 20 is formed from a single piece of material that is folded upon itself and stitched around three edges to form a generally rectangular bag. The inflatable knee bag 20 includes front and rear panels 150 and 152, respectively. The front and rear panels 150 and 152 are sewn together along a lower edge 154, an inboard edge 156, and an outboard edge 158 of the inflatable knee bag 20. A fold that separates the front and rear panels 150 and 152 of the inflatable knee bag 20 forms an upper edge 160 of the inflatable knee bag. The front panel 150 of the inflatable knee bag 20 includes a portion 162 (FIG. 5D) for receiving the inflator 18. Three holes (not shown) extend through the front panel 150 of the inflatable knee bag 20 for receiving the mounting studs 112 and the fill valve 114 of the inflator 18. Preferably, the inflator 18 is positioned within the inflatable knee bag 20 through an opening (not shown) on the outboard edge 158 of the inflatable knee bag 20. The opening in the outboard edge 158 of the inflatable knee bag 20 is then sewn closed after the inflator 18 is received within the inflatable knee bag.

The inflatable knee bag 20 also includes two tethers 164 that connect the front and rear panels 150 and 152. Each tether 164 is formed from an elongated piece of fabric material and includes opposite first and second ends 166 and 168, respectively. A first end 166 of each tether 164 is sewn to the front panel 150 of the inflatable knee bag 20 and a second end 168 of each tether is sewn to the rear panel 152 of the inflatable knee bag. The tethers 164 help to maintain a fixed distance between the front and rear panels 150 and 152 when the inflatable knee bag 20 is in the inflated condition 46, which results in flattening of the inflated knee bag.

The inflatable knee bag 20 is stored within the cavity 86 of the trough 80 of the reaction plate 60 when in a stored condition. FIGS. 5A–5F illustrate a method of compacting the inflatable knee bag 20 into the stored condition.

As a reference, the dashed box shown in FIGS. 5A and 5B is the opening to the cavity 86 of the trough 80 of the reaction plate 60. The inflator 18 is also illustrated in FIGS. 5A and 5B.

Figures 5D, 5E, 5F:
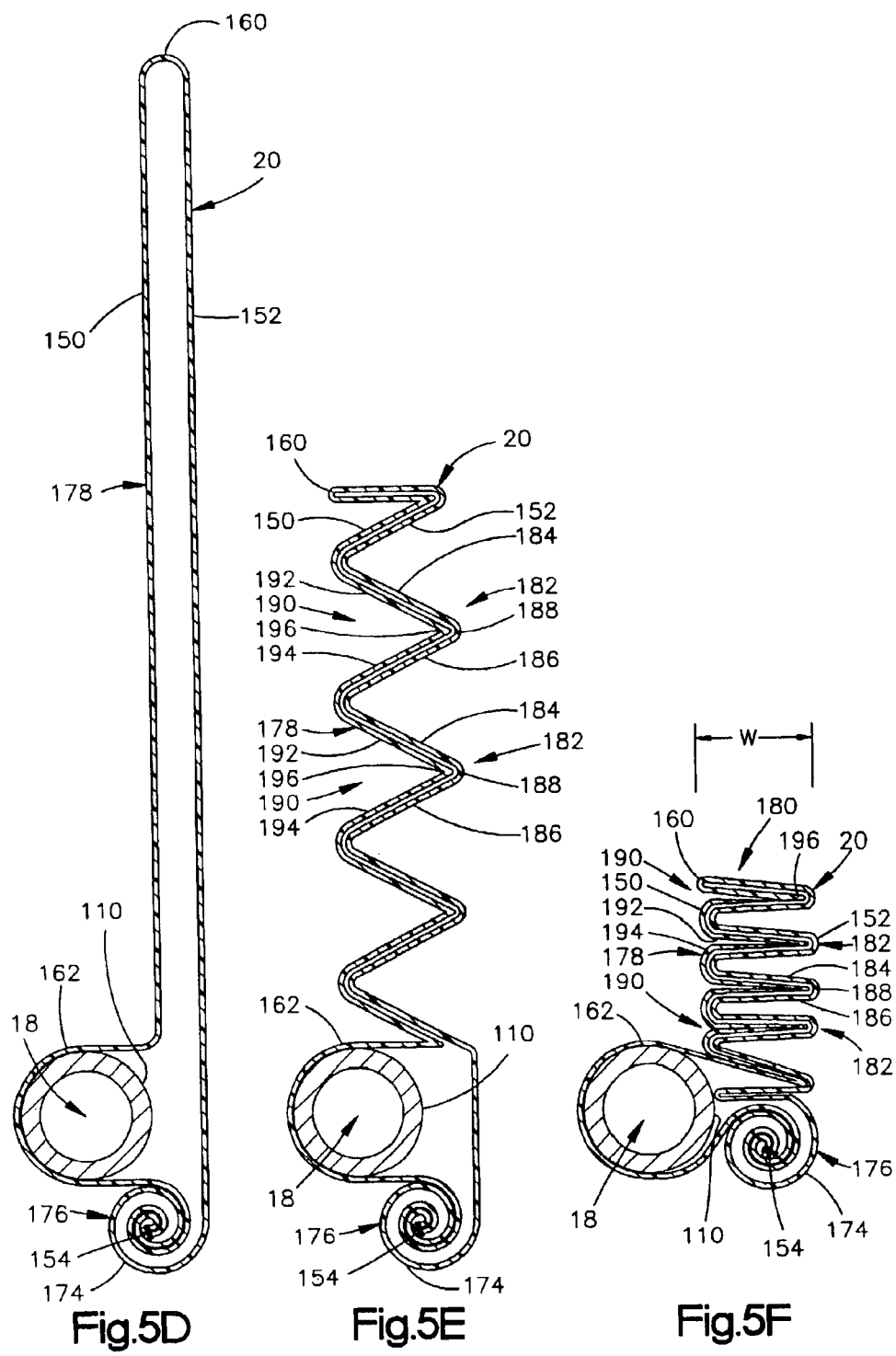

To compact the knee bag 20 into the stored condition, the knee bag 20 is laid flat with the rear panel 152 overlying the front panel 150. The knee bag 20 is then folded by moving the inboard edge 156 of the knee bag 20 laterally toward the outboard edge 158, in the direction indicated by arrow 170 in FIGS. 5A–5B, until the inboard edge 156 extends slightly beyond the center of the knee bag. After forming this first fold, the inboard edge 156 is moved laterally outwardly until the inboard edge aligns with the first fold line, as shown in FIGS. 5B and 5C. The lower edge 154 of the inflatable knee bag 20 is then rolled upwardly, indicated by arrow 172 in FIG. 5B, in a direction toward the front panel 150 so that the rear panel 152 of the inflatable knee bag forms an outer surface 174 of a rolled lower portion 176 of the inflatable knee bag 20, as is shown in FIG. 5D. The lower portion 176 of the inflatable knee bag 20 is defined between the lower edge 154 and a center of the inflator receiving portion 162 in the inflatable knee bag.

An upper portion 178 of the inflatable knee bag 20 is defined between the upper edge 160 and a center of the inflator receiving portion 162 in the inflatable knee bag. The upper portion 178 of the inflatable knee bag 20 is formed into a stack 180 (FIG. 5F) of pleated sections. To form the stack 180 of pleated sections, the upper portion 178 of the inflatable knee bag 20 is zigzag folded, as shown in FIG. 5E.

The stack 180 of pleated sections includes a first plurality of pleated sections 182 formed by portion of the rear panel 152 of the inflatable knee bag 20. Each pleated section 182 of the first plurality of pleated sections 182 includes upper and lower laterally extending pleat surfaces 184 and 186, respectively, that are separated by a laterally extending pleat fold 188. The pleat fold 188 forms the rearmost portion of each pleated section 182.

The stack 180 of pleated sections also includes a second plurality of pleated sections 190 formed by portions of the front panel 150 of the inflatable knee bag 20. Each pleated section 190 of the second plurality of pleated sections 190 includes upper and lower laterally extending pleat surfaces 192 and 194, respectively, that are separated by a laterally extending pleat fold 196. The pleat fold 196 forms the rearmost portion of each pleated section 190. Preferably, each of the upper and lower laterally extending surfaces 184, 186, 192, and 194 of the pleated sections 182 and 190 has a width, indicated generally as W in FIG. 5F, of approximately 23–25 millimeters.

Each pleated section 182 of the first plurality of pleated sections 182 has an associated pleated section 190 of the second plurality of pleated sections 190. The pleated section 182 receives the associated pleated section 190 so that the upper and lower laterally extending surfaces 192 and 194 of the associated pleated section 190 are interposed between upper and lower laterally extending surfaces 184 and 186 of the pleated section 182.

The stack 180 of pleated sections is compacted and positioned above the rolled lower portion 176 of the inflatable knee bag 20. The stack 180 of pleated sections and the rolled lower portion 176 of the inflatable knee bag 20 are then positioned immediately adjacent to and rearward of the inflator 18 to place the inflatable knee bag in the stored condition, shown in FIG. 5F. When in the stored condition, the stack 180 of pleated sections begins near the center of the inflator 18 and extends upwardly. The inflatable knee bag 20, when in the stored condition, may be wrapped with a rupturable wrap (not shown) to help maintain the inflatable knee bag in the stored condition.

The reaction plate 60 of the knee bag module 16 is attached to the instrument panel 34 so that the opening of the cavity 86 in the trough 80 of the reaction plate opens rearward into the passenger compartment 32. The inflatable knee bag 20, in the stored condition, and the inflator 18, which is positioned in the inflatable knee bag, are positioned within the cavity 86 in the deep portion 96 of the trough 80. The mounting bolts 112 and fill valve 114 of the inflator 18 are received in the through-holes 100 of the end wall 92 of the trough 80. Nuts 200 (FIG. 4) are screwed onto the mounting bolts to secure the inflator relative to the reaction plate 60. Rubber washers (not shown) may be positioned over the mounting bolts 112 for creating a seal between the reaction plate 60 and the inflator housing 110 and for sealing the bolt holes in the inflatable knee bag 20 when the inflator 18 is secured to the reaction plate.

After securing the inflator 18 to the reaction plate 60, the inflatable knee bag 20, in the stored condition, is positioned in the cavity 86 of the trough 80. When stored in the cavity 86, the pleat folds 188 of the first plurality of pleated sections 182 lie adjacent the opening of the cavity 186 of the trough 80. The stack 180 of pleated sections extends along the opening of the cavity 186 from the center of the inflator 18 to a position adjacent the upper wall 88 of the trough 80.

The rolled lower portion 176 of the inflatable knee bag 20 is positioned adjacent the opening of the cavity 86 near the lower wall 90 of the trough 80.

The cover 120 is then positioned over the reaction plate 60 and is secured to the plate portion 62 of the reaction plate 60. The cover 120 closes the opening of the cavity 86 and overlies the inflatable knee bag 20 when the inflatable knee bag is in the stored condition within the cavity to protect the inflatable knee bag from damage. When the cover 120 is secured to the reaction plate 60, the tear seam 136 of the cover 120 is located near the top of the stack 180 of pleated section, as shown in FIG. 3.

When the inflator 18 of the apparatus 10 is actuated, inflation fluid provided by the inflator 18 enters the inflatable knee bag 20. In response to receiving inflation fluid, the stack 180 of pleated sections begins to inflate. When the pressure within the stack 180 of pleated sections reaches a predetermined pressure, the expanding knee bag 20 causes the tear seam 136 in the cover 120 to open. The stack 180 of pleated sections then expands outward of the cavity 86 of the reaction plate 60 and upward between the instrument panel 34 and the lower portion 48 of the legs 50 of the occupant 12.

After the stack 180 of pleated sections begins to inflate, the rolled lower portion 176 of the inflatable knee bag 20 begins to unroll and expand downward between the instrument panel 34 and the lower portions 48 of the legs 50 of the occupant 12. During inflation of the lower and upper portions 176 and 178 of the inflatable knee bag 20, the laterally inwardly folded portion (shown in FIGS. 5B and 5C) of the inflatable knee bag is inflated. The inflatable knee bag 20 inflates laterally in an inboard direction as the laterally inwardly folded portion of the inflatable knee bag is inflated to ensure that the lower portions 48 of both legs 50 of the occupant 12 are protected.

When inflation of the inflatable knee bag 20 is complete, the inflatable knee bag 20 is in an inflated condition 46. In the inflated condition 46, the center of the inflatable knee bag 20 of the apparatus 10 is located in plane 38, as shown in FIG. 2.

From the above description of the invention, those skilled in the art will perceive improvements, changes and modifications. Such improvements, changes and modifications within the skill of the art are intended to be covered by the appended claims.

Having described the invention, we claim the following:

1. Apparatus for helping to protect an occupant of a vehicle having an instrument panel by preventing a forceful impact between lower portions of legs of the occupant and the instrument panel during a vehicle collision, the apparatus comprising:

an inflator actuatable for providing inflation fluid; and an inflatable vehicle occupant protection device for receiving inflation fluid from the inflator and inflating from a stored condition to an inflated condition engaging the lower portions of legs of the occupant, the inflatable vehicle occupant protection device including upper and lower portions, the lower portion being rolled and the upper portion being folded into a stack of pleated sections when the vehicle occupant protection device is in the stored condition.

2. The apparatus as set forth in claim 1 wherein the inflatable vehicle occupant protection device includes front and rear panels, the front panel being adjacent the instrument panel and the rear panel engaging the lower portions of the legs of the occupant when the inflatable vehicle occupant protection device is in the inflated condition, the stack of pleated sections including a first plurality of pleated sections formed from portions of the rear panel of the inflatable vehicle occupant protection device and a second plurality of pleated sections formed from portions of the front panel of the inflatable vehicle occupant protection device.

3. The apparatus as set forth in claim 2 wherein pleated sections of the first plurality of pleated section receive pleated sections of the second plurality of pleated sections.

4. The apparatus as set forth in claim 2 wherein each pleated section of the first plurality of pleated sections includes laterally extending upper and lower pleat surfaces that are separated by a laterally extending pleat fold, the laterally extending pleat fold forming a rearmost portion of the pleated section of the first plurality of pleated sections.

5. The apparatus as set forth in claim 4 wherein each pleated section of the second plurality of pleated sections includes laterally extending upper and lower pleat surfaces that are separated by a laterally extending pleat fold, the laterally extending pleat fold forming a rearmost portion of the pleated section of the second plurality of pleated sections.

6. The apparatus as set forth in claim 5 wherein each pleated section of the first plurality of pleated sections has an associated pleated section of the second plurality of pleated sections, the associated pleated section of the second plurality of pleated sections being received in the pleated section of the first plurality of pleated sections so that the upper and lower pleat surfaces of the associated pleated section of the second plurality of pleated sections are interposed between the upper and lower pleat surfaces of the pleated section of the first plurality of pleated sections.

7. The apparatus as set forth in claim 1 wherein the stack of pleated sections is located above the rolled lower portion of the inflatable vehicle occupant protection device and extends upwardly from the rolled lower portion.

8. The apparatus as set forth in claim 1 wherein, when the inflatable vehicle occupant protection device is in the stored condition, a lowermost portion of the stack of pleated sections is located adjacent a center of the inflator and the stack of pleated sections extends upwardly above the center of the inflator.

9. The apparatus as set forth in claim 8 wherein the inflatable vehicle occupant protection device includes front and rear panels, the front panel being adjacent the instrument panel and the rear panel engaging the lower portions of the legs of the occupant when the inflatable vehicle occupant protection device is in the inflated condition, an outer surface of the rolled lower portion of the inflatable vehicle occupant protection device being formed by the rear panel of the inflatable vehicle occupant protection device.

10. The apparatus as set forth in claim 1 wherein the inflatable vehicle occupant protection device, when in the stored condition, also including a laterally inwardly folded portion, an upper portion of the laterally inwardly folded portion being included in the stack of pleated sections and a lower portion of the laterally inwardly folded portion being included in the rolled lower portion of the inflatable vehicle occupant protection device.

11. The apparatus as set forth in claim 1 wherein the inflatable vehicle occupant protection device includes front and rear panels, the front panel being adjacent the instrument panel and the rear panel engaging the lower portions of the legs of the occupant when the inflatable vehicle occupant protection device is in the inflated condition, at least one tether connecting the front and rear panels of the inflatable vehicle occupant protection device and limiting a distance between the front and rear panels when the inflatable vehicle occupant protection device is in the inflated condition.

12. The apparatus as set forth in claim 6 further including a reaction plate defining a cavity with an opening, the inflatable vehicle occupant protection device being located within the cavity when in the stored condition and inflating through the opening of the cavity during inflation from the stored condition to the inflated condition, the pleat fold of each pleated section of the first plurality of pleated sections lying adjacent the opening of the cavity when the inflatable vehicle occupant protection device is in the stored condition.

13. The apparatus as set forth in claim 12 wherein a cover extends over the opening of the cavity for covering the inflatable vehicle occupant protection device when in the stored condition within the cavity, the cover having a rupturable portion that is ruptured by the inflatable vehicle occupant protection device during inflation from the stored condition to the inflated condition.

14. Apparatus for helping to protect an occupant of a vehicle having an instrument panel by preventing a forceful impact between lower portions of legs of the occupant and the instrument panel during a vehicle collision, the apparatus comprising:

a reaction plate attached to the instrument panel of the vehicle and including structure defining a cavity having an opening;

an inflator in the cavity and secured to the structure of the reaction plate, the inflator being actuatable for providing inflation fluid;

an inflatable vehicle occupant protection device that, in response to receiving inflation fluid, inflates from a stored condition within the cavity to an inflated condition engaging the lower portions of legs of the occupant, the inflatable vehicle occupant protection device, when in the stored condition, including a stack of pleated sections that extends upwardly from a rolled portion of the inflatable vehicle occupant protection device; and a cover for covering the opening of the cavity and the inflatable vehicle occupant protection device when the inflatable vehicle occupant protection device is in the stored condition, the cover including a portion that is rupturable by the inflatable vehicle occupant protection device to enable expansion of the inflatable vehicle occupant protection device from the stored condition to the inflated condition.

15. The apparatus as set forth in claim 14 wherein the inflatable vehicle occupant protection device includes front and rear panels, the front panel being adjacent the instrument panel and the rear panel engaging the lower portions of the legs of the occupant when the inflatable vehicle occupant protection device is in the inflated condition, the stack of pleated sections including a first plurality of pleated sections formed from portions of the rear panel of the inflatable vehicle occupant protection device and a second plurality of pleated sections formed from portions of the front panel of the inflatable vehicle occupant protection device.

16. The apparatus as set forth in claim 15 wherein pleated sections of the first plurality of pleated section receive pleated sections of the second plurality of pleated sections.

17. The apparatus as set forth in claim 15 wherein each pleated section of the first plurality of pleated sections includes laterally extending upper and lower pleat surfaces that are separated by a laterally extending pleat fold, the laterally extending pleat fold forming a rearmost portion of the pleated section of the first plurality of pleated sections.

18. The apparatus as set forth in claim 17 wherein each pleated section of the second plurality of pleated sections includes laterally extending upper and lower pleat surfaces that are separated by a laterally extending pleat fold, the laterally extending pleat fold forming a rearmost portion of the pleated section of the second plurality of pleated sections.

19. The apparatus as set forth in claim 18 wherein each pleated section of the first plurality of pleated sections has an associated pleated section of the second plurality of pleated sections, the associated pleated section of the second plurality of pleated sections being received in the pleated section of the first plurality of pleated sections so that the upper and lower pleat surfaces of the associated pleated section of the second plurality of pleated sections are interposed between the upper and lower pleat surfaces of the pleated section of the first plurality of pleated sections.

20. The apparatus as set forth in claim 14 wherein, when the inflatable vehicle occupant protection device is in the stored condition, a lowermost portion of the stack of pleated sections is located adjacent a center of the inflator and the stack of pleated sections extends upwardly above the center of the inflator.

21. The apparatus as set forth in claim 20 wherein the inflatable vehicle occupant protection device includes front and rear panels, the front panel being adjacent the instrument panel and the rear panel engaging the lower portions of the legs of the occupant when the inflatable vehicle occupant protection device is in the inflated condition, an outer surface of the rolled lower portion of the inflatable vehicle occupant protection device being formed by the rear panel of the inflatable vehicle occupant protection device.

22. The apparatus as set forth in claim 14 wherein the inflatable vehicle occupant protection device, when in the stored condition, also including a laterally inwardly folded portion, an upper portion of the laterally inwardly folded portion being included in the stack of pleated sections and a lower portion of the laterally inwardly folded portion being included in the rolled lower portion of the inflatable vehicle occupant protection device.

23. The apparatus as set forth in claim 14 wherein the inflatable vehicle occupant protection device includes front and rear panels, the front panel being adjacent the instrument panel and the rear panel engaging the lower portions of the legs of the occupant when the inflatable vehicle occupant protection device is in the inflated condition, at least one tether connecting the front and rear panels of the inflatable vehicle occupant protection device and limiting a distance between the front and rear panels when the inflatable vehicle occupant protection device is in the inflated condition.

24. The apparatus as set forth in claim 14 wherein the rupturable portion of the cover includes a laterally extending portion that is located near a top of the stack of pleated sections.

25. The apparatus as set forth in claim 1 wherein the upper portion of the inflatable vehicle occupant protection device extends between an upper edge of the inflatable vehicle occupant protection device and the inflator and the lower portion of the inflatable vehicle occupant protection device extends between a lower edge of the inflatable vehicle occupant protection device and the inflator.

26. The apparatus as set forth in claim 1 further including a reaction plate having a cavity in which the inflatable vehicle occupant protection device is stored when in the stored condition, a center of the inflatable vehicle occupant protection device, when the inflatable vehicle occupant protection device is in the inflated condition, being laterally offset from a lateral center of the cavity.

27. The apparatus as set forth in claim 1 further including a reaction plate having a cavity in which the inflatable vehicle occupant protection device is stored when in the stored condition, the cavity having a deep portion that is located laterally adjacent a shallow portion, the inflator being fixed to the reaction plate in the deep portion of the cavity.

28. The apparatus as set forth in claim 27 wherein the reaction plate further includes laterally opposite inboard and outboard edges, the deep portion of the cavity being located nearer the outboard edge and the shallow portion being located nearer the inboard edge.

29. The apparatus as set forth in claim 14 wherein the stack of pleated sections is formed from an upper portion of the inflatable vehicle occupant protection device and the rolled portion is formed from a lower portion of the inflatable vehicle occupant protection device, the upper portion extending between an upper edge of the inflatable vehicle occupant protection device and the inflator and the lower portion extending between a lower edge of the inflatable vehicle occupant protection device and the inflator.

30. The apparatus as set forth in claim 14 wherein a center of the inflatable vehicle occupant protection device, when the inflatable occupant protection device is in the inflated condition, being laterally offset from a lateral center of the cavity of the reaction plate.

31. The apparatus as set forth in claim 14 wherein the cavity of the reaction plate has a deep portion that is located laterally adjacent a shallow portion, the inflator being fixed to the reaction plate in the deep portion of the cavity.

32. The apparatus as set forth in claim 27 wherein the reaction plate further includes laterally opposite inboard and outboard edges, the deep portion of the cavity being located nearer the outboard edge and the shallow portion being located nearer the inboard edge.

* * * * *